(12) United States Patent
Boss et al.

(10) Patent No.: US 7,478,283 B2
(45) Date of Patent: Jan. 13, 2009

(54) PROVISIONAL APPLICATION MANAGEMENT WITH AUTOMATED ACCEPTANCE TESTS AND DECISION CRITERIA

(75) Inventors: Gregory Jensen Boss, American Fork, UT (US); Rick Allen Hamilton, II, Charlottesville, VA (US); James Wesley Seaman, Falls Church, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 11/041,712

(22) Filed: Jan. 22, 2005

(65) Prior Publication Data

US 2006/0168165 A1 Jul. 27, 2006

(51) Int. Cl.
*G06F 11/00* (2006.01)
(52) U.S. Cl. .............................. 714/38; 714/25; 714/39; 717/174
(58) Field of Classification Search .................. 714/25, 714/38, 39; 717/174, 176, 177
See application file for complete search history.

(56) References Cited

U.S. PATENT DOCUMENTS

| | | | |
|---|---|---|---|
| 5,119,377 A | 6/1992 | Cobb et al. | |
| 5,513,316 A | 4/1996 | Rodrigues et al. | |
| 5,835,735 A | 11/1998 | Mason et al. | |
| 6,128,618 A | 10/2000 | Eliovson | |
| 6,615,376 B1 | 9/2003 | Olin et al. | |
| 6,618,823 B1 | 9/2003 | West | |
| 6,708,333 B1 | 3/2004 | Glerum et al. | |
| 6,928,579 B2* | 8/2005 | Aija et al. | 714/6 |
| 2002/0112145 A1 | 8/2002 | Bigbee et al. | |
| 2003/0046681 A1* | 3/2003 | Barturen et al. | 717/177 |
| 2004/0015747 A1 | 1/2004 | Dwyer | |
| 2004/0103412 A1 | 5/2004 | Rao et al. | |
| 2005/0022176 A1* | 1/2005 | Ramachandran et al. | 717/170 |

\* cited by examiner

*Primary Examiner*—Robert Beausoliel
*Assistant Examiner*—Charles Ehne
(74) *Attorney, Agent, or Firm*—David A. Mim. Jr.; Dillon & Yudell LLP

(57) ABSTRACT

A method and system for testing newly installed or recently upgraded software is presented. All software installation activities are tracked and logged. New and upgrade software is isolated, either physically or logically, and tested using diagnostic software. If the new/upgrade isolated software passes the testing by the diagnostic software, then it is allowed to operate in the presence of other previously installed software. If an error occurs during an execution of the new/upgrade software, either while isolated or in the presence of previously loaded software, a log of other concurrently running software is reviewed to determine a likely software incompatibility with the new/upgrade software.

1 Claim, 3 Drawing Sheets

PROVISIONAL APPLICATION MANAGEMENT WITH AUTOMATED ACCEPTANCE TESTS AND DECISION CRITERIA

BACKGROUND OF THE INVENTION

1. Technical Field

The present invention relates in general to the field of computers, and in particular to computer software. Still more particularly, the present invention is a productivity-enhancing tool that improves application integration, integrity, and troubleshooting through an automated installation control and diagnostic process.

2. Description of the Related Art

The average computer users today, whether business or casual, have dozens and perhaps even hundreds of disparate applications installed and running on their computers at any given time. Additionally, new applications are continuously added to computing environments, while existing applications are often patched to correct known problems or upgraded to add functionality. Often application upgrades and patches come in related groupings such that multiple changes are introduced into a computing environment simultaneously.

For example, if a user installs a new version of a web browser, a new version of a Java plug-in may be required and automatically installed with the new browser. Additionally, software companies often bundle patches and fixes into large groupings, frequently containing hundreds of files, to be installed simultaneously as a "fix pack" or "release level." Additionally, many operating systems allow for automated and unattended installation of such patches and upgrades, such that the end user may not even be aware that an installation activity has occurred. With the complexity of modern computers, applications, and operating systems, errors are often unintentionally introduced into the computing environment when new applications, patches, or upgrades are applied.

Presently, whether software is installed automatically or manually, no satisfactory method exists to preemptively ensure the continued integrity of the computing environment as a whole after new software has been installed. Typically, when problems occur, the end user will call someone for help, and will describe the problem encountered. This is generally followed by a series of manually executed investigative processes and perhaps diagnostic routines. This method can be very inefficient and time consuming, and often fails to pinpoint the cause of failure, thus resulting in the need to reinstall the operating system or application. Additionally, automated and bundled installations can exacerbate the problem due to the many changes introduced at once, and the fact that a specific set of running applications which may induce a problem potentially would not be running simultaneously for many days, weeks, or months after the software changes are affected. This makes it very unlikely, even if the end user was aware that a software change had occurred, that the upgrade/installation would come to mind as a potential cause of an error encountered much later.

Thus, there is a need for a method and system to closely manage and control all installation activities, and to preemptively detect, diagnose, and correct errors introduced into the computing environment as a result of such installation activities. Preferably, such a method and system would enhance existing software installation, integration, and testing through an automated and preemptive installation tracking, diagnostic, and management tool.

SUMMARY OF THE INVENTION

The present invention is thus directed to a method and system for testing newly installed or recently upgraded software. All software installation activities are tracked and logged. New and upgrade software is isolated, either physically or logically, and tested using diagnostic software. If the new/upgrade isolated software passes the testing by the diagnostic software, then it is allowed to operate in the presence of other previously installed software. If an error occurs during an execution of the new/upgrade software, either while isolated or in the presence of previously loaded software, a log of other concurrently running software is reviewed to determine a likely software incompatibility with the new/upgrade software.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
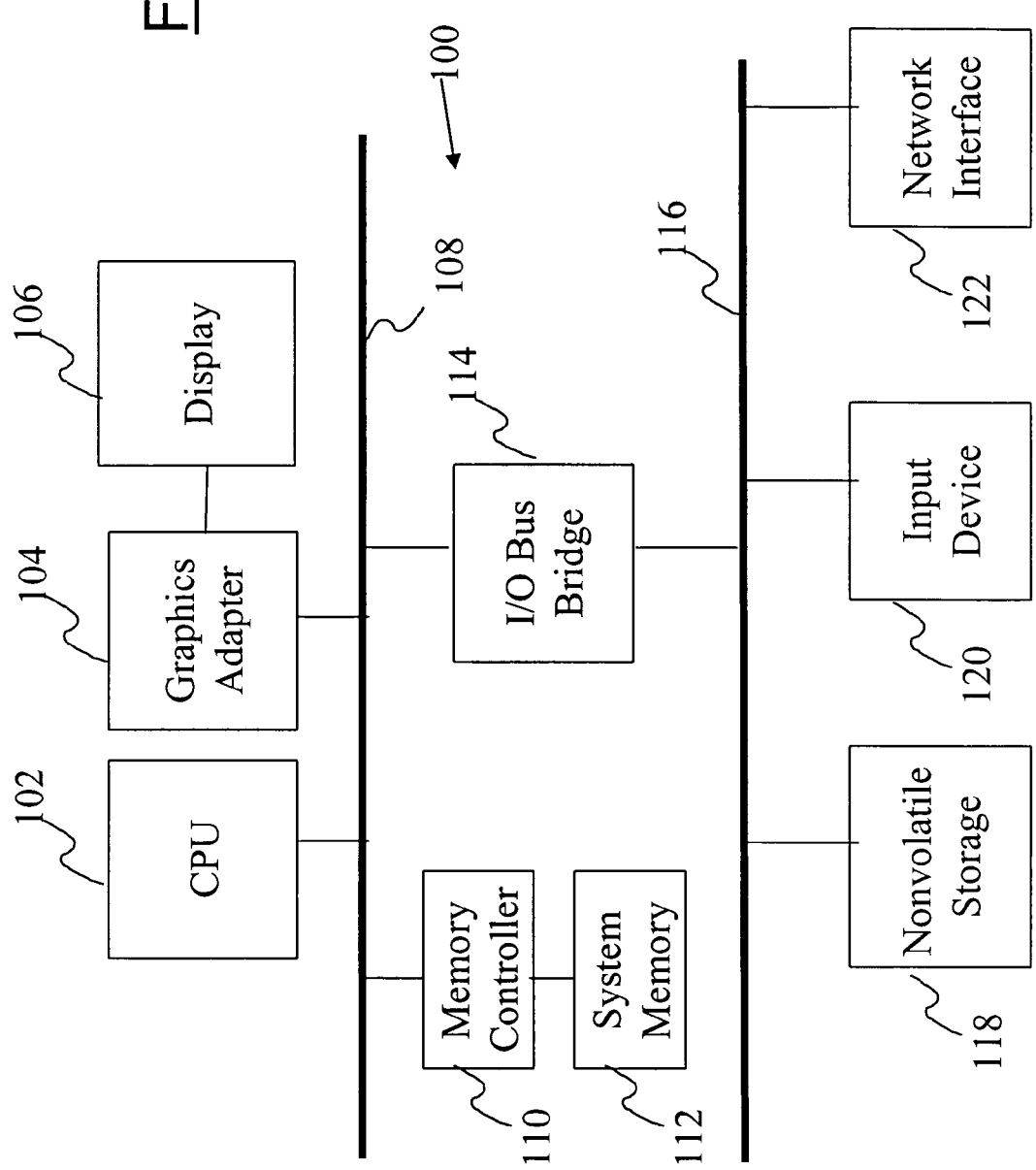
FIG. 1 depicts an exemplary computer system which may be utilized by the present invention.

With reference now to the figures, and particularly to FIG. 1, there is depicted a block diagram of an exemplary data processing system in which a preferred embodiment of the present invention may be implemented. Data processing system 100 may be, for example, one of the models of personal or server computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a memory controller 110 for a system memory 112, and an input/output (I/O) bus bridge 114. I/O bus bridge 114 couples an I/O bus 116 to system bus 108, relaying and/or transforming data transactions from one bus to the other. Peripheral devices such as nonvolatile storage 118, which may be a hard disk drive, and input devices 120, which may include a conventional mouse, a trackball, or the like, or, especially in the present invention, a scanner, are connected to I/O bus 116. Also connected to I/O bus 116 is a network interface 122, which affords data communication between a (not shown) local or wide area network connection (including the Internet) and data processing system 100.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention.

Figure 2:
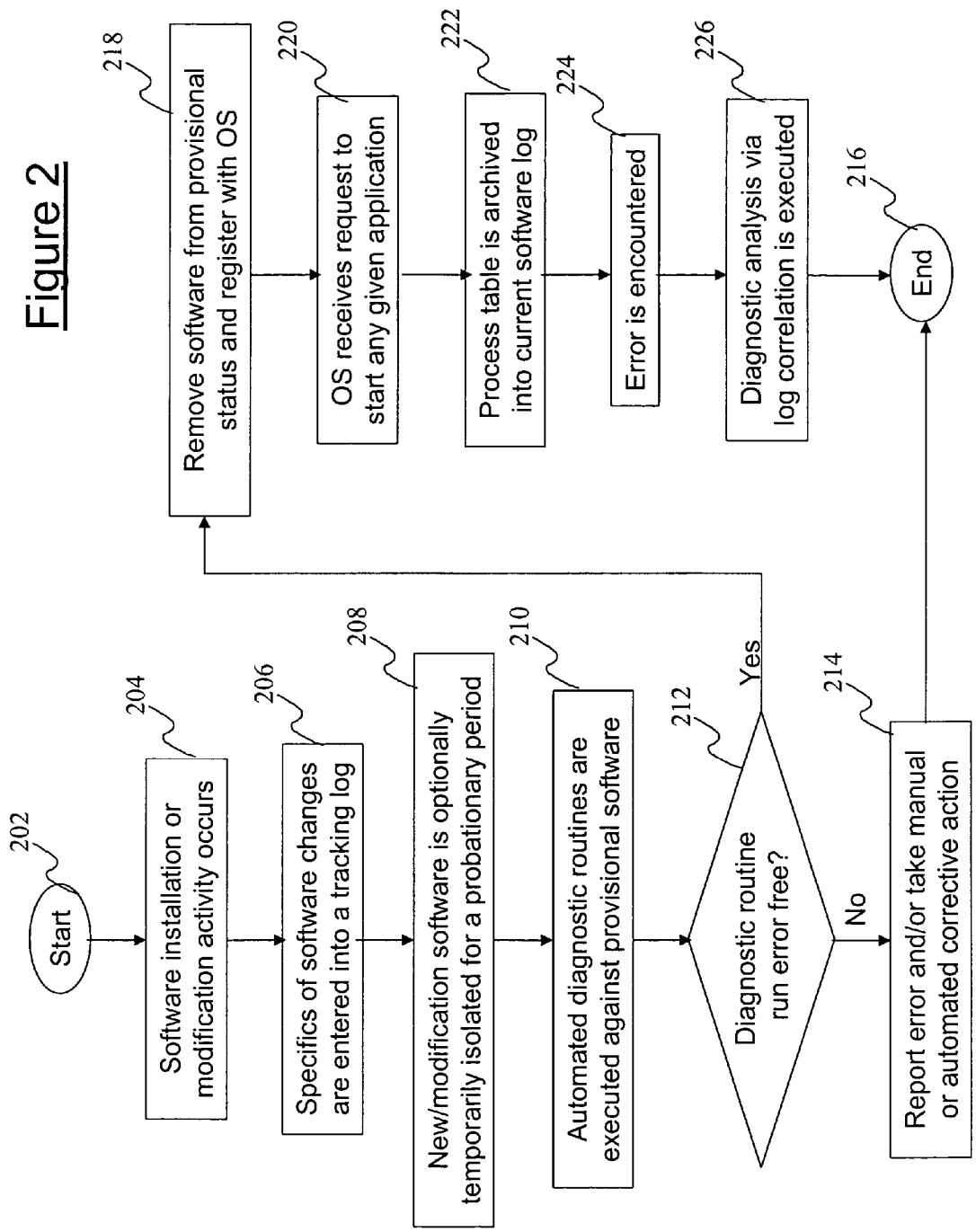
FIG. 2 is a flow-chart of steps taken in a preferred embodiment of the present invention to evaluate newly installed software.

With reference now to FIG. 2, there is depicted a flow chart of steps taken in a preferred embodiment of the present invention. After initiator block 202, software is installed (block 204) into a computer such as shown in FIG. 1. This software may be a new application, operating system, etc., or it may be an upgrade or patch to software previously loaded into the computer. As described in block 206, all new software is tracked and logged, thus providing a record of all changes made to the computing software environment. This tracking and logging will be the basis for establishing probationary time periods and for assisting with problem determination, as described below.

With reference to block 208, the new/modification software is optionally temporarily isolated for a probationary period. That is, new software, whether a new application/operating system or a modification of existing software, may be temporarily isolated at some level from the remaining computing environment. This isolation may be a physical isolation, whereby the new software is installed into a discrete location (e.g., partition, file system, directory, etc.), or the isolation may be a logical isolation such that the new software is not permitted to run with existing mature software while the new software is still in a provisional state.

In the case of new software such as some operating system patches or other such modifications, it may not be possible to isolate the new software, and thus step 208 will be skipped. For example, many operating system executables must reside in a specific path, or directory. In such a case, it may be desirable to actively track the modified system software for some probationary period of time prior to declaring it "mature." This tracking process may include setting modules in debug mode to collect detailed log data each time the operating system executable runs until such time as the software is declared mature.

With reference now to block 210, automated diagnostic routine(s) are then executed against the new provisional software. These routines automatically test all provisional software in combination with all registered (mature) software. In a preferred embodiment, if multiple provisional software components exist, then each provisional component is individually tested in a serial manner such that a second item (item 2) in a provisional software list would not be tested until a first item (item 1) in the list had been declared mature. This will reduce the chances of multiple provisional components which may not be stable, thus causing system errors when executed together.

Additionally, the automated diagnostic tests would preferably be run during off-hours, or during low usage periods, as determined and defined by the user. The tests may be as simple as starting and stopping registered applications with the current provisional software in varying combinations and orders, or may be more comprehensive and actually exercise various application functionalities during the test period.

After running the diagnostic routine(s) on the new software, a query is made (query block 212) asking if the new software passed (was able to run the diagnostic testing without inducing an error). If not, then the error is reported, and corrective action is optionally taken (block 214), and the process ends (terminator block 216). However, if the new software passed, then it is deemed "mature," and removed from provisional status (block 218). Alternatively, a passage of a predetermined amount of time alone may be the sole factor considered when declaring a provisional software module as being mature. In that case, rather than declare a module mature after all registered applications have run with it simultaneously, it would be desirable to include a separate or included time requirement. That is, the software may be declared to be mature only after a specific period of time and having run simultaneously with some or all of the existing software, or the software may be declared to be mature simply after a pre-determined period of time (with the assumption that its simple presence for a period of time will instill a confidence that the new software is compatible.)

With reference now to block 220, an operating system (OS) in the computer receives a request to start any given application, including the new (now mature) software. As described in block 222, a process table is archived into a current software log. This process allows for enhanced problem determination of software if errors are encountered. By capturing the process logs prior to starting all new software, the effective result is that "before and after" data is available if later scrutiny is necessary. Relevant process data which may be important to capture would include the name of the executing software, active resource usage, running time, and other data which may be used to prioritize or filter results during diagnostic analysis, as described below.

Referring now to block 224, assume for illustrative purposes that an error in the computer has occurred while executing the newly loaded and now mature software. As described in block 226, a diagnostic analysis using log correlation is executed using archive data and history logs. The combination of collected process and installation history logs, in conjunction with the provisional status of installed software and weighted correlation techniques, provides for a powerful enhancement to existing software problem determination methods. Analysis of executing combinations of software can be correlated with suspect modules, the provisional/mature status of modules, and an analysis showing where more active applications may bear a higher weighting factor than running a process with a very low percentage of activity.

Figure 3:
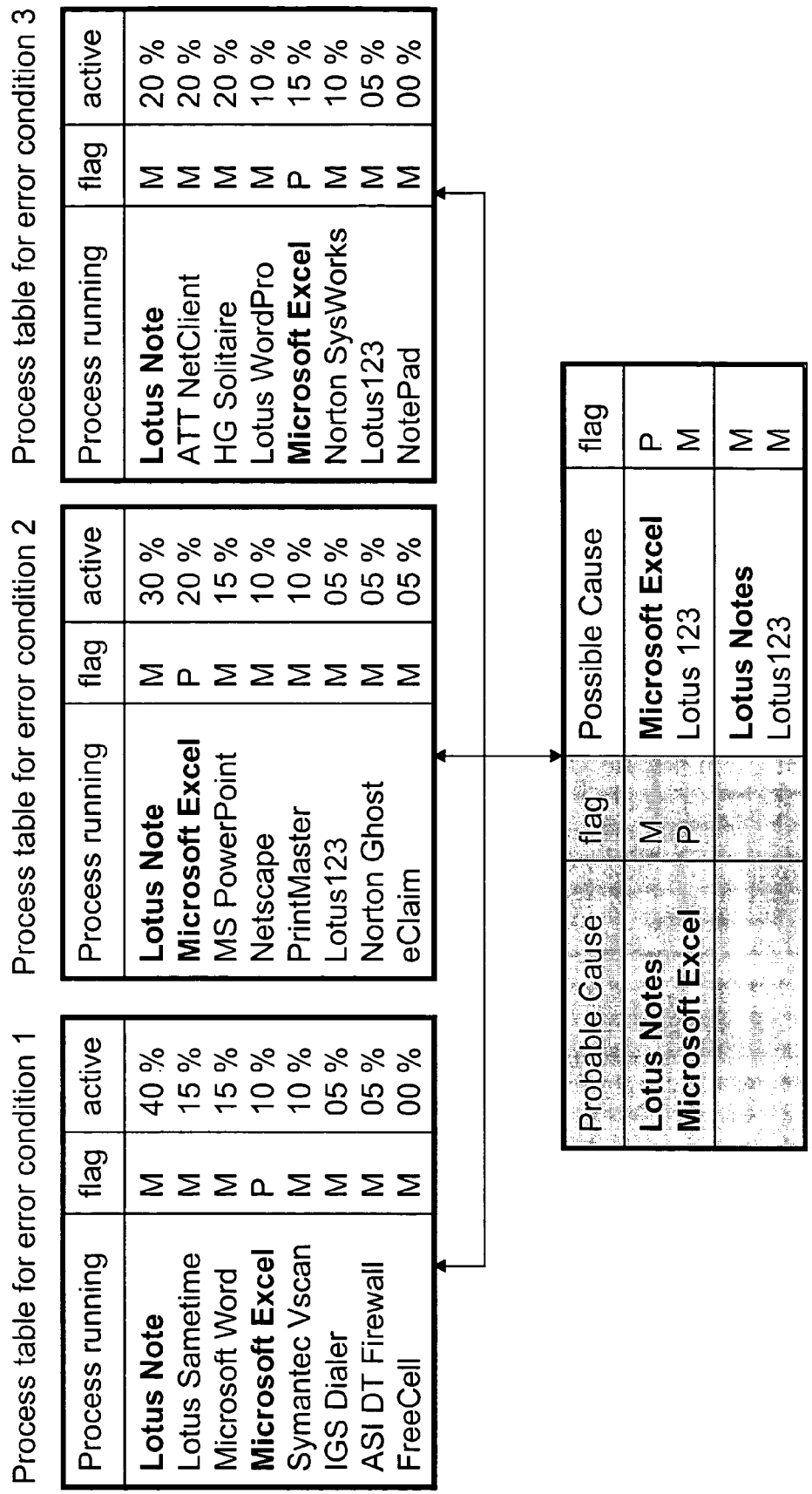
FIG. 3 depicts process tables for different error conditions, which provide data for a probably/possible cause table of software conflicts.

For example, consider the process tables shown in FIG. 3, in which each of the three process tables are for a different error condition. Exemplary error conditions include a system crash, an application hang (in the new software or in an existing software), a core dump, or other similar fault situations.

The process tables shown in FIG. 3 indicate that the most probable software incompatibility in the particular computer is Lotus Notes® and Microsoft Excel®. This determination is based on 1) both applications were executing when all three errors occurred, 2) Microsoft Excel® is in a provisional state (and thus had not passed the diagnostic routine(s) described in block 210 of FIG. 2), and 3) both applications were among the most active when all three errors occurred.

Note, however, that Lotus123® was also executing during two or the three failures (error conditions 2 and 3). Thus, Lotus123® is considered as a possible failure cause, particularly when running with Microsoft Excel® (since Microsoft Excel is in the provisional state) or with Lotus Notes® (since Lotus Notes® is the most active application running simultaneously with Lotus123® in the process tables for error conditions 2 and 3).

Alternatively, assume that Lotus Notes® is the newly installed software. Microsoft Excel® is in a provisional state during each of the error conditions in which Lotus Notes® is also running. Thus, it can be inferred that the newly installed Lotus Notes® is incompatible with Microsoft Excel® while Microsoft Excel® is in the provisional state.

Similarly, if Microsoft Excel® is the newly installed/upgraded software, then Lotus Notes® is viewed as a likely incompatible program, since Lotus Notes® is at such a high level of activity during each of the error conditions.

The example shown in FIG. 3 is not intended to be exhaustive of the scope of the present invention. That is, other correlations can be extrapolated from such tracking and logging data. Furthermore, such data could also be used for the purpose of filtering results. For example, software which was running, but not active, may be filtered before correlation and comparison, thus excluding such software from consideration. In the example shown in FIG. 3, FreeCell® and NotePad® would be excluded, because although the applications were running, neither application was active when an error condition occurred.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The present invention therefore provides a useful method and means for isolating a software incompatibility. Note that the present invention can be utilized by an owner/user of a computer system in which an above-described error condition occurs, or a third party service may remotely monitor/control/evaluate newly loaded software on a customer's computer, using a network interface to the customer's computer. The third party service can thus remotely perform the analysis described in FIG. 3, and make seamless changes to the customer's computer to fix the problem. Such changes may include running an artificial system to determine why the new software caused the particular error conditions in the customer's computer, and making appropriate corrections to the customer's computer to prevent such errors.

While the invention has been particularly shown and described with reference to a preferred embodiment, it will be understood by those skilled in the art that various changes in form and detail may be made therein without departing from the spirit and scope of the invention.

What is claimed is:

1. A method comprising:

installing in a computer a new software, wherein the new software is isolated from old software in the computer;

designating the new software as being in a provisional status, wherein the new software is deemed to be under the provisional status for a pre-determined period of time after being installed;

monitoring the computer while the new software is running, under the provisional status, in an isolated location;

upon detecting a first error condition in the computer while the new software is running in the isolated location, reporting the first error condition;

upon detecting no error condition in the computer while the new software is running in the isolated location, removing the provisional status from the new software;

executing the new software with other existing software in the computer;

upon detecting multiple error conditions when the new software executes with the other existing software in the computer, determining an incompatibility between the new software and the other existing software by evaluating the multiple error conditions that occur when the new software is run in the computer, wherein evaluating the multiple error conditions includes identifying another software that is running with the new software in all of the multiple error conditions, and wherein evaluating the multiple error conditions includes identifying a provisional software that is running with the new software when one or more of the multiple error conditions occurs, and wherein evaluating the multiple error conditions includes identifying a highly active software that is running with the new software when one of the error conditions occurred;

eliminating an inactive software as a potential cause of one or more of the multiple error conditions; and in response to detecting the multiple error conditions, removing the new software from the computer, wherein the monitoring, reporting, removing, executing, determining, eliminating and removing steps are only performed while the new software is under the provisional status.

* * * * *